Jan. 11, 1938.  H. S. COVER  2,105,183

VALVE

Filed Nov. 19, 1934

Witnesses:
E. E. Wessels
Aasta E. Matson

Inventor:
Harvey S. Cover.
By Joshua R. H. Potts
his Attorney.

Patented Jan. 11, 1938

2,105,183

UNITED STATES PATENT OFFICE 2,105,183

VALVE

Harvey S. Cover, South Bend, Ind.

Application November 19, 1934, Serial No. 753,573

7 Claims. (Cl. 251—119)

My invention relates to valves and relates particularly to valves including exhaust valves for respirators and has for one object among others the provision of a respirator having a novel type exhaust valve. This invention is broadly related to my copending applications, Serial Nos. 722,619, 662,929, now Patent No. 2,000,064, 684,503, 684,968, 724,817, and 744,879, filed respectively on April 27, 1934, March 27, 1933, August 10, 1933, August 14, 1933, May 9, 1934, and September 21, 1934.

The valve of the present invention represents improvements over previous valves. It is a continuation in part of application, Serial No. 722,619, to which application together with the others reference is hereby made. The improved valve of the present invention is adapted to be used, for example, with the respirator of said application, Serial No. 722,619, and other respirators. In the drawing of the form selected to illustrate the principle of my invention only a portion of the respirator itself, to wit, the bulbous extension and portions of the adjoining wall are shown. The entire respirator of the form of the present invention was fully disclosed in the last mentioned application. (See particularly Figs. 6 and 7 of said application.) It is not felt necessary to repeat in detail the description of the form selected in said application and used in the present application for purposes of illustration as reference may be made to said application.

An object among others of the present invention is the provision of improved means for operating the movable element of the valve shown, for example, in said application, No. 722,619. To that end I have provided a valve arrangement with a movable element which will be sensitive and which will have an efficient closing operation in addition to efficient opening operation. In addition I have provided a valve arrangement whereby the movable element thereof may be placed in the valve frame by persons without experience in such matters and with the utmost ease, and which will work with a maximum efficiency at the same time. Other objects of the invention are economy of manufacture and simplicity of structure and operation.

Other objects will appear hereinafter.

My invention will be best understood by reference to the accompanying drawing, in which.

Figure 1:
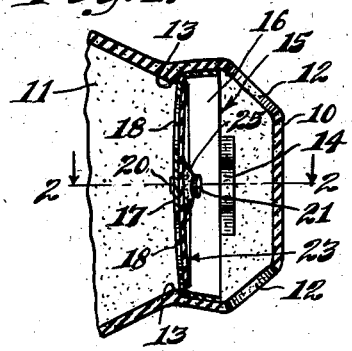
Fig. 1 is a vertical central section of a valve embodying my invention, shown applied to the bulbous extension of a respirator similar to that, for example, of application, No. 722,619.

The preferred form of the device of my invention selected to illustrate the principle of my invention is shown applied to a bulbous extension 10 of a respirator integrally formed in the form shown with the walls 11 of the respirator. The bulbous extension 10 is of greater length than width and is preferably provided with a pair of openings 12, one of which is arranged at each end thereof in the form shown; and as will be apparent from Figs. 1 and 2 the bulbous extension 10 may also be provided with a retaining bead 13 and lugs 14 for retaining the valve of my invention as will hereinafter more fully appear and as pointed out in previous applications.

Referring to the valve arrangement of the present invention, the same includes a valve carrying frame 15 which may be ovally shaped. The frame comprises an annular flange 16 and a base plate 17 which is concave as will be clear from Figs. 1, 2, and 4, looking from the bulbous end of the respirator. The base plate 17 is provided with a pair of spaced exhaust openings 18, clearly shown in Fig. 5, which are in the nature of three-quarter circle openings, each one having a lineal portion 19.

The valve carrying frame 15 is also provided with a pair of stud pins 20 secured in the frame 15 in an obvious manner, the pins having heads 21 and reduced portions 22. The pins are adapted to act as hinges for the movable valve element 23 which may be made from a thin sheet of flexible and resilient rubber material which is of sufficient area to substantially cover the base plate 17. The movable valve element 23 is provided with a pair of apertures adapted to register with the pins 20. These appertures are smaller than the reduced portions 22 so that the aperture forming walls 25 seat in a conelike manner about the reduced portions 22 of the pins 20, and in this manner they form pockets 26 between the portions of the flap resting on the base plate 17, as particularly shown in Fig. 4. It will be obvious from the drawings that the pins of the base plate are centrally located therein in the form shown, and the apertures 24 of the movable valve element 23 are also located centrally of the movable element so that when the movable element is placed in position the curved portions 25 will be under tension and will gently but firmly force the valve to lie snugly upon the base plate 17 and within the flange 16.

As will be manifest to those skilled in the art, it is desirable to have as efficient closing action and closing registration between the movable element and the apertures of the base plate as is possible, so as to seal off the outside air as much as possible, and of course it is also desirable to have as efficient an opening action of the valve as is possible. By the arrangement of my preferred form with the features of the concave oval base and the arrangement of the hinging means, I have accomplished a highly improved valve structure. The movable element, as will be obvious from the drawing, is oval, and with the arrangement of the hinging apertures as shown in Fig. 6 will give a highly improved closing action and also an improved result in retaining the movable element in effective registration with the apertures of the valve frame, as will be manifest to those experienced with the subject matter. As has also been pointed out, the base plate is similarly oval and concave as very clearly shown in Figs. 1, 2, and 4, and when the movable element is placed in position on the base plate the relation will be as shown in those figures, the movable element also assuming a concave registering relation. The movable element may be temporarily affixed into the condition shown in Fig. 4 very quickly and simply by the ordinary person without any experience in such matters. With little or no care the movable element may be placed in the condition which is best suited for operation, that is, the condition shown in Fig. 4. When the element is in this position the structure will function to move the movable element into and retain it in efficient closing relation with the base plate to seal off the outside atmosphere, and at the same time the structure will function by means of the pocket forming or spacing feature to make possible an extremely efficient opening action as will be manifest to those skilled in the art. It will be apparent also that the partly curvilinear and partly linear opening 18 will cause the movable element to function more efficiently. It will of course be understood that the movable element is very easily removable.

Figure 2:
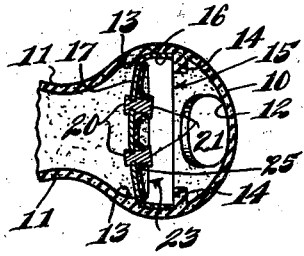
Fig. 2 is a plan section of the same, taken on the line 2—2 of Fig. 1.
Figures 3, 5, 6:
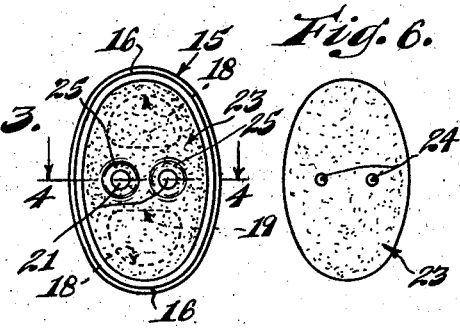
Fig. 3 is an outer face view of the valve and valve carrying frame.
Fig. 5 is an inner view of the valve carrying frame, that is, a view taken from the face contacting end of the respirator.
Fig. 6 is a face view of the movable flap element of the valve.
Figure 4:
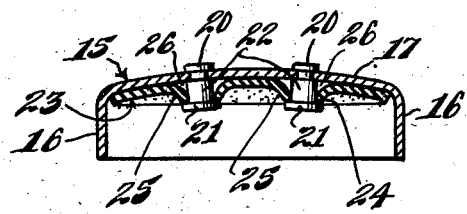
Fig. 4 is a sectional view taken on the line 4—4 of Fig. 3.

The pins 20 may be slightly inclined toward each other as shown in Figs. 2 and 4 to increase the snapping tension of the movable element.

While I have illustrated and described the preferred form of structure for carrying my invention into effect, it is desired to emphasize that what has been illustrated and described is only a form, and the invention is capable of being embodied in other variations and modifications without departing from the spirit of the invention; nor is it necessary that the several features pointed out be employed together to accomplish the improved result described. I, therefore, do not wish to be limited to the details of construction set forth, but desire to avail myself of such variations and modifications as come within the scope of the appended claims.

Having thus described my invention, what I claim as new and desire to secure by Letters Patent is:

1. In a valve, a concave plate forming a valve seat provided with an aperture, a movable flexible valve element adapted to open and close upon said aperture, and means for holding said movable element in operative relation to said plate and providing sole means for distorting the adjacent portion of said valve element to maintain the same in concave condition.

2. In a valve, a plate provided with an aperture and a supporting pin; and a movable flexible valve element adapted to open and close upon said aperture and provided with an opening to receive said pin, said opening being smaller in circumference than the pin whereby the adjacent portion of the valve element is flexed.

3. A device as set forth in claim 2 in which the supporting pin is formed with a retaining head over which the valve member is stretched to position the same and against which the edge of the flexed portion thereof abuts.

4. In a respirator valve, an elongated plate of thin material having an opening upon each side of its transverse medial axis and a pair of headed pins spaced apart on said transverse axis, a flexible valve element adapted to open and close said openings, and provided with a pair of openings to receive said pins, whereby said pins form the sole means for distorting the adjacent portions of said valve to maintain the same in a concave shape substantially as described.

5. A device as set forth in claim 4 in which the openings in the valve member are of smaller diameter than that of said pins, as and for the purpose specified.

6. A device as set forth in claim 4 in which the plate is concave and the pins are inclined toward each other as and for the purpose specified.

7. A device as set forth in claim 4 in which the valve holding pins are arranged remote from the edge of the valve and the periphery of the valve is free, and in which said elongated plate is provided with a peripheral supporting flange, substantially as described.

HARVEY S. COVER.